United States Patent [19]
Iyengar et al.

[11] Patent Number: 6,038,393
[45] Date of Patent: *Mar. 14, 2000

[54] SOFTWARE DEVELOPMENT TOOL TO ACCEPT OBJECT MODELING DATA FROM A WIDE VARIETY OF OTHER VENDORS AND FILTER THE FORMAT INTO A FORMAT THAT IS ABLE TO BE STORED IN OMG COMPLIANT UML REPRESENTATION

[75] Inventors: Sridhar Srinivasa Iyengar, Irvine; James Albert Fontana, Mission Viejo; Norman Roy Smith, Lake Forest; Brian Edward Pattinson, Trabuco Canyon; Anthony Reginald Pitchford, Mission Viejo; Mireille Mathilde Staub, Coto de Caza, all of Calif.

[73] Assignee: Unisys Corp., Blue Bell, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 08/934,834

[22] Filed: Sep. 22, 1997

[51] Int. Cl.[7] .......................................................... G06F 9/44
[52] U.S. Cl. ............................................................... 395/701
[58] Field of Search ..................................... 395/707, 701

[56] References Cited

PUBLICATIONS

Rational Rose Extensibility Reference Manual Rat–XR partial manual, Nov. 1996.
Rational Rose Using Rational Rose 4.0 Rational Corporation manual, Dec. 1996.
Rational Rose/C+ + Round Trip Engineering with Rational Rose/C+ + Rational Corporation manual, Dec. 1996.
Rational Rose Unified Modeling Langauge UML & Booch OMT Quick Reference for Rational 4.0 guide, Dec. 1996.
Rational Rose Extensibility Guide Rational Software Corporation manual, Dec. 1996.
Principles of Object Analysis and Design, James Martin p. 14, Dec. 1993.

Object–Oriented Analysis and Design with Applications, Grady Booch, Oct. 1993.

Object–Oriented Modeling and Design, James Rumbaugh et al., Nov. 1990.

Object–Oriented Software Engineering A Use Case Driven Approach, Ivar Jacobson, Jan. 1996.

Dictionary of Object Technology, Firesmith et al. pp. 184–186, Sep. 1995.

Template Software SNAP 8.0 Chapter on Patterns released Jun. 1997, Jan. 1998.

*Primary Examiner*—Tariq R. Hafiz
*Assistant Examiner*—Todd Ingberg
*Attorney, Agent, or Firm*—J. Ronald Richebourg; Mark T. Starr; Steven B. Samuels

[57] ABSTRACT

A programmed computer system transforms a distinctive representation of a business model into a generic representation format, such as the Unified Modeling Language ("UML") object model. The system also transforms legacy business processes, including legacy applications into UML format. The UML format of the business model and legacy components are stored in a central repository. The system also allows the reverse engineering and reverse transformation of UML models into a distinctive representation of business models and application components. The transformation of business model information into a UML model is achieved by identifying the differences between these models and creating a bidirectional mapping of the differences. The system also allows for selective movement of objects and models between business process models and UML. In other words, a user may select individual objects to be moved between models.

11 Claims, 13 Drawing Sheets

SOFTWARE DEVELOPMENT TOOL TO ACCEPT OBJECT MODELING DATA FROM A WIDE VARIETY OF OTHER VENDORS AND FILTER THE FORMAT INTO A FORMAT THAT IS ABLE TO BE STORED IN OMG COMPLIANT UML REPRESENTATION

FIELD OF THE INVENTION

The present invention relates in general to the field of automated systems for developing business applications. In particular, it relates to a system and a method for exchanging information between different object models and the Unified Modeling Language model.

BACKGROUND OF THE INVENTION

Business models are often utilized as a blueprint to depict how a company should operate and develop. Depending on the tool utilized, business models may be portrayed in different forms. One of the more common ways of representing business process models is by means of workflow diagrams.

Business process models define business processes. Business processes describe activities that need to be performed within an organization. Examples of such activities may include processing purchase orders, payroll processing, or processing insurance claims. Actual software applications may be derived from business processes. These software applications, in conjunction with other software systems or team of humans, may accomplish a defined business process.

Creation of business applications results in a need for a comprehensive environment that will support the entire business application development process. The process may start with the building of business models and progress to representing the business models as object models. The next step may be creating source code for the business logic, that is, the creation of methods for the business processes that represent details of how the business runs. For example, if the business process is the handling of purchase orders, one detail about how this process is accomplished may be that purchase orders over $1,000 must be approved by a manager. The development process may then proceed to building and wrapping components (reusable pieces of code), building applications from the components, and installing the new applications and components into the appropriate environments.

The development process results in a further need to discover legacy systems, that is, existing applications, components, business processes, or other legacy systems, and integrate them into new business models which may in turn generate new business applications. The incorporation of existing legacy items into new applications will help preserve investments made in creating the legacy systems.

The current technology does not adequately address these needs. Although there are tools which allow implementation of parts of the development process, no one single environment exists which supports the process from beginning to end.

Another shortcoming of existing technology is the lack of ability to discover existing legacy items and incorporate them into new applications. Although there are tools that allow transformation of some legacy items into certain kinds of object models, these tools do not utilize the models to generate business applications. Furthermore, these tools are limited in their reverse engineering capabilities, and are also not generalized, meaning that they are able to transform only certain types of legacy items into object models.

Another reason why existing technology does not adequately support legacy integration is because of the lack of an efficient method to exchange relevant information between object models. Object models are often created to define the business objects used by various business processes. But because there is no efficient method of exchanging information between object models that utilize different object modeling methods, objects appearing in one model cannot be utilized in another modeling tool.

A further shortcoming of the current technology is the lack of tool and middleware independence in creating business applications. As an example of this shortcoming, if one tool is used to develop the business process model, one might be bound in the selection of the tools to create the application source code for the model. The lack of tool independence is mainly due to the inability to exchange information between tools.

Existing technology also does not allow specification and/or generation of source code for applications in a middleware-independent form. Thus, a component of an application built with one middleware cannot be automatically reused in a different environment with a different middleware.

SUMMARY OF THE INVENTION

A programmed computer system according to the present invention attacks many of these problems. The programmed computer system includes a means of transforming a distinctive representation of business model information into a generalized representation of at least a portion of a business model. This invention utilizes the Unified Modeling Language ("UML") object model as the generic representation. Thus, output data of each of the tools used during the development process is transformed into UML and saved in the repository. The system also allows the reverse engineering of UML models into a distinctive representation of business model information.

The transformation of business model information into a UML model is achieved by identifying the differences between these models and creating a bidirectional mapping of the differences. The system also allows for selective movement of objects and models between business process models and UML. In other words, a user may select individual objects to be moved between models.

DETAILED DESCRIPTION

The preferred embodiment of the present invention comprises of a computer system having a user interface, a memory, a repository, and a set of third party tools. The computer system may be one of any variety of heterogeneous platforms, including PCs, Unix, Macintosh and Unisys systems. A user may select among various third party tools provided by the shell process to implement each stage of the application development. The shell process invokes the third party tools and coordinates the transfer of control between them.

Figure 1:
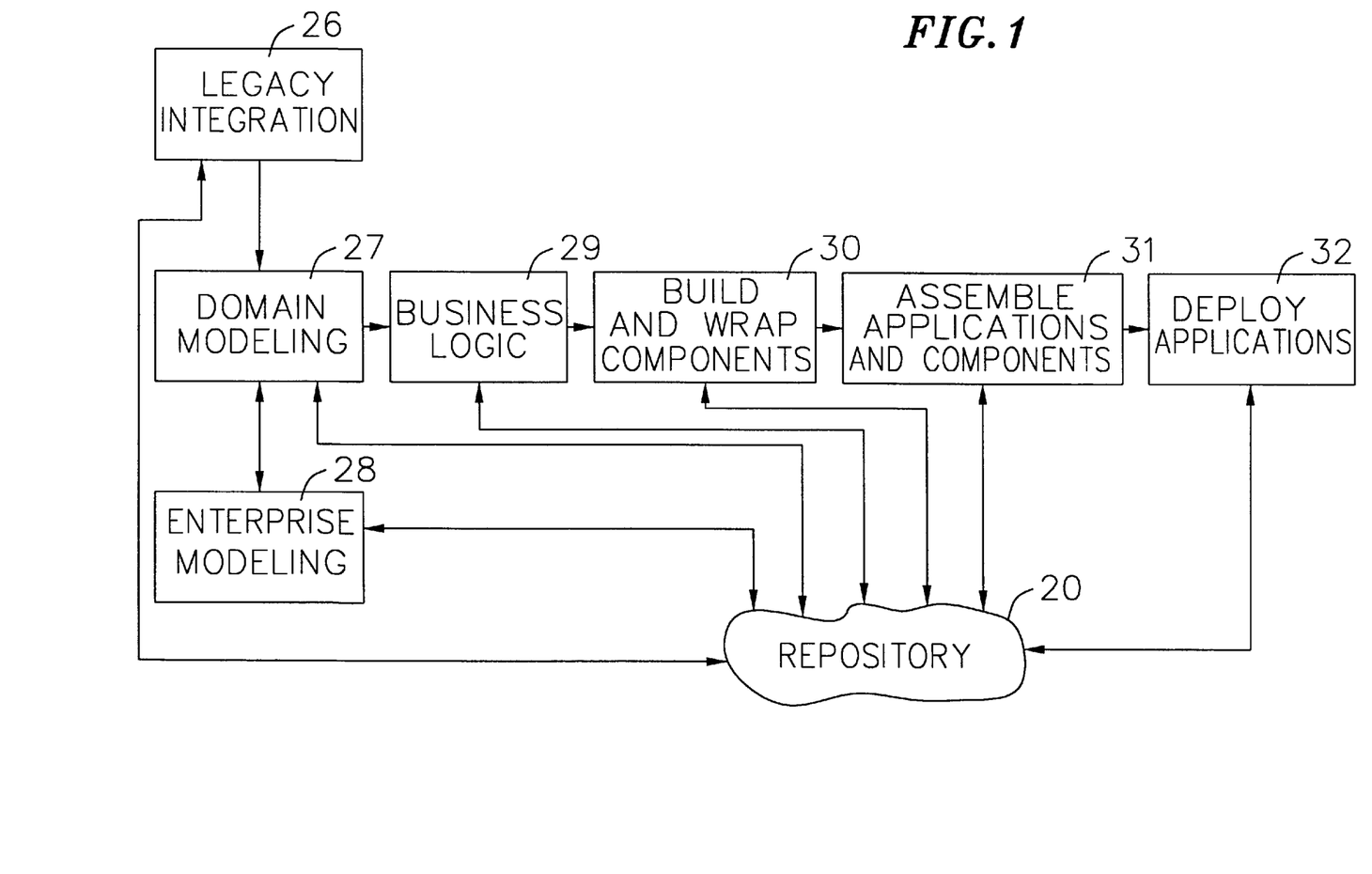
FIG. 1 is a diagram illustrating the general flow of the development process.

FIG. 1 shows the general flow of the application development process supported by the system. During legacy integration 26, legacy items are either discovered or transformed. Legacy items may include pre-existing applications, components, business processes, or other legacy systems. The discovered legacy items may then be transformed into business or object models, or into reusable components. In order for this to occur, however, the system must first transform a discovered legacy item to Rational's Unified Modeling Language (UML) model.

UML is a method for specifying, visualizing, and documenting the components (objects) of a system under development. Existing object-oriented methods all use different, and often conflicting, terminology to represent object-oriented concepts such as classes, associations, subtypes, and aggregations. UML is the result of an effort to create standardization in the various object-oriented methods.

UML is used in the preferred embodiment of the invention as a neutral object model, which is based on a set of object classes defined and stored in the repository 20. Alternative embodiments for specific types of models may use future standard models, such as the Business Object Facility and Common Business Objects, which are currently under development by the Object Management Group, as well as the upcoming Workflow Coalition workflow model.

Once legacy systems are transformed into UML, the resulting UML model is stored in the repository 20 and may become the basis for creating new business process models or object models. These, in turn, may become the basis for new applications. The transformation process is described below in more detail in conjunction with a description of FIGS. 3a–3f.

During the enterprise modeling 28 stage, business process models are created. These models are also transformed to UML object models and saved in the repository 20. The UML models may then be transformed into other object or business process models, or into reusable components.

Object models are created during the domain modeling 27 stage. Object models contain a variety of diagrams, including class diagrams. Object models may also contain use cases and some logic, such as state diagrams.

Class diagrams describe the types of objects in a system and the various kinds of relationships which exist between them. Three main kinds of relationships are associations (e.g. a customer may rent a number of videos, the association being between a customer and videos), subtypes (e.g. a doctor is a kind of person) and aggregations (e.g. an engine is part of an automobile). A subtype relationship is between types; association and aggregation relationships are between objects.

Object models created during the domain modeling stage are transformed into UML models and saved in the repository 20. The UML models created may then be transformed into other object or business process models, or into reusable components.

The next step in the development flow may be to write and edit the source code for the business logic, that is, the methods for the business processes. This is accomplished in the business logic 29 stage. The methods are then built and wrapped into components in the component building phase 30. Built components are assembled into applications in the application assembly stage 31. Finally, applications are deployed to the appropriate environments in the application deployment 32 stage.

Each of the phases of the development process is described in more detail in the U.S. patent application submitted on the same day (i.e., Sep. 22, 1997) as this application, also assigned to the assignee of this application, entitled TOOL-INDEPENDENT APPLICATION DEVELOPMENT SYSTEM Ser. N0. 08/934,833, which is incorporated by reference as if set forth in fill herein.

Each tool employed during the development process puts information into a repository 20 and takes information out of the repository 20. In this way, the system integrates the tools used in different parts of the development process by passing necessary information from one tool to another.

The repository 20 is, therefore, the central store of all information. All of the entities and objects associated with the application under development, as well as relationships between these entities and objects, are stored in the repository 20. For example, the repository 20 may contain all of the business models, business logic application code, and binary components associated with an application.

The repository 20 further includes tools for cataloging, browsing, and managing components that make up an application. Methods to support these services are disclosed in several patents and patent applications assigned to the assignee of this application, including U.S. Pat. No. 5,671, 398 for METHOD FOR COLLAPSING A VERSION TREE WHICH DEPICTS A HISTORY OF SYSTEM DATA AND PROCESSES FOR AN ENTERPRISE; U.S. Pat. No. 5,644, 764 for METHOD FOR SUPPORTING OBJECT MODELING IN A REPOSITORY; U.S. Pat. No. 5,581,755 for METHOD FOR MAINTAINING A HISTORY OF SYSTEM DATA AND PROCESSES FOR AN ENTERPRISE; U.S. Pat. No. 5,557,793 for IN AN OBJECT ORIENTED REPOSITORY, A METHOD FOR TREATING A GROUP OF OBJECTS AS A SINGLE OBJECT DURING EXECUTION OF AN OPERATION; pending application Ser. No. 08/623,490, filed on Mar. 28,1996, for A METHOD FOR MAPPING TYPES IN A MODEL IN A OBJECT-ORIENTED REPOSITORY TO LANGUAGE CONSTRUCTS FOR A C BINDING FOR THE REPOSITORY; pending application Ser. No. 08/567,394, filed on Dec. 1, 1995, for METHOD FOR GENERICALLY INVOKING OPERATIONS IN AN OBJECT ORIENTED REPOSITORY; pending application Ser. No. 08/549,352, filed on Oct. 27, 1995, for A METHOD FOR GENERATING OLE AUTOMATION AND IDL INTERFACES FROM METADATA INFORMATION; pending application Ser. No. 08/505,140, filed on Jul. 25, 1995, for A METHOD FOR PROVIDING OBJECT DATABASE INDEPENDENCE IN A PROGRAM WRITTEN USING THE C++ PROGRAMMING LANGUAGE; pending application Ser. No. 08/506, 647, filed on Jul. 25, 1995, for A METHOD FOR GENERICALLY MANIPULATING PROPERTIES OF OBJECTS IN AN OBJECT ORIENTED REPOSITORY; pending application Ser. No. 08/489,313, filed on Jun. 9, 1995, for A METHOD FOR LOCATING A VERSIONED OBJECT WITHIN A VERSION TREE DEPICTING A HISTORY OF SYSTEM DATA AND PROCESSES FOR AN ENTERPRISE; pending application Ser. No. 08/655,553, filed on May 30, 1996 for A METHOD FOR PACKING/ UNPACKING C OPERATIONS TO/FROM RPC COMPATIBLE FORMAT USING THE RPC PROTOCOL TO OPERATE REMOTELY WITH AN OBJECT-ORIENTED REPOSITORY, each of which are hereby incorporated by reference as if set forth in full herein.

The shell process allows users to enter the development process at any stage. As an example, the user may decide to skip the enterprise modeling 28 stage entirely and go straight into domain modeling 27. The system therefore naturally supports the highly iterative nature of application development.

The system also supports legacy integration 26. This is achieved by allowing discovery and access to legacy items at run time, and transforming them into UML object models. These models are then saved in the repository 20 and can later be transformed into other object or business process models, or into reusable components.

Tool independence is another feature supported by the system. The system allows tools used in one stage of the development process to transfer information to other tools used in other parts of the process by means of the repository 20. In other words, the repository 20 allows specific attributes to be attached to the applications under development in one part of the development flow, and those same attributes can be interrogated and used by other tools in other parts of the development flow. Developers may therefore freely choose among the most popular development tools for any stage of the development process without worrying about the coordination of these tools.

The system also provides middleware independence. This is achieved by creating and maintaining source code for the various components of the applications in a middleware-independent form. Middleware may be described as software that provides connectivity between clients and servers. These may include connectivity to database, or messaging connectivity.

The creation of middleware independent components allows developers to delay the need to decide which middleware is to be used until the components are built. This permits the same components to be used in different environments with different middlewares.

Figure 2:
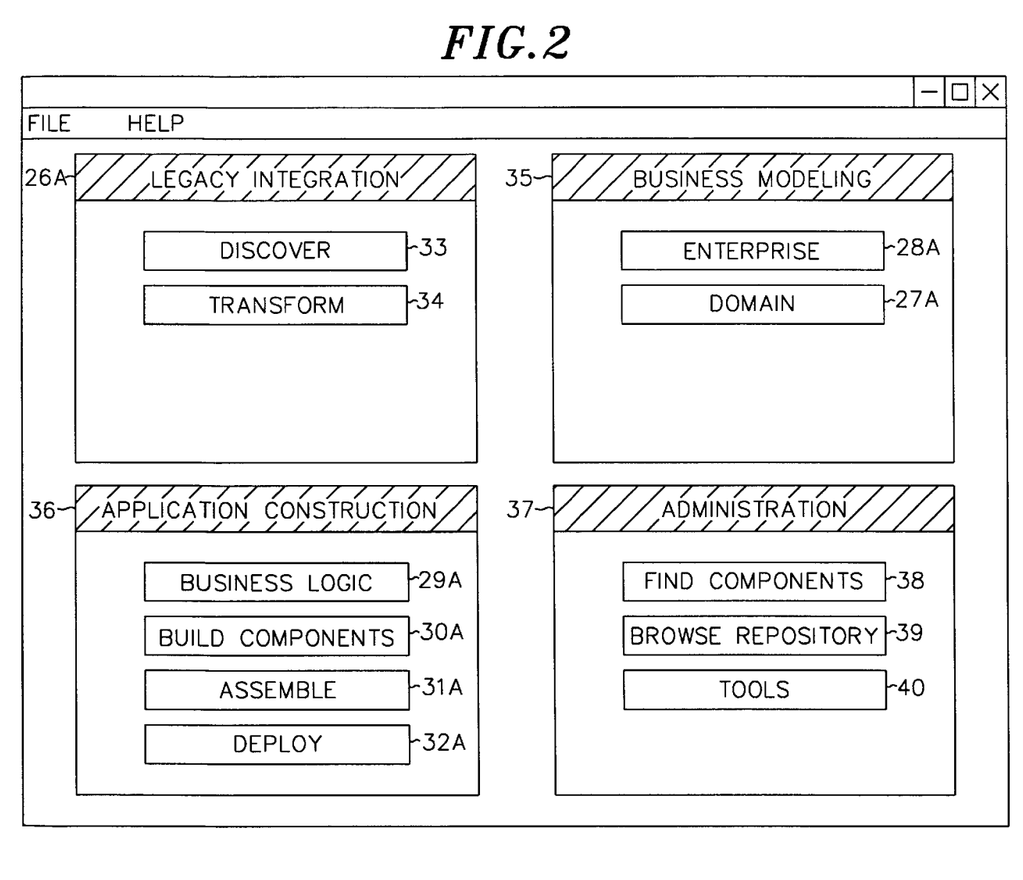
FIG. 2 is a sample screen presentation of the shell process.

FIG. 2 is a sample screen presentation of the shell process. It consists of a legacy integration window 26a, business modeling window 35, application construction window 36, and administration window 37.

The legacy integration window 26a contains two user options, a discover option 33 and a transform option 34. These allow a user to discover legacy systems and transform them into other object or business process models.

The business modeling window 35 allows the user to do the enterprise modeling 28 or domain modeling 27 steps illustrated in FIG. 1. Thus, a user may select the enterprise button 28a or the domain button 27a to invoke the respective processes.

The application construction window 36 presents the user with a business logic button 29a, build components button 30a, assemble button 31a, and a deploy button 32a. These buttons invoke, respectively, the business logic 29, component building 30, application assembly 31, and application deployment 32 processes shown in FIG. 1.

Under the administration window 37, a user may perform several administrative tasks. He may browse, search, and install components by selecting the find components button 38. He may also view information in the underlying repository 20 shown in FIG. 1 by selecting the browse repository button 39. Finally, the user may also install and configure third party tools by selecting the tools button 40.

The shell process is described in more detail in the above-referenced TOOL-INDEPENDENT APPLICATION DEVELOPMENT SYSTEM application.

It would be appropriate at this point to describe how legacy items, business process models, and non-UML object models are transformed into UML object models, and vice-versa. To accomplish this filters are written for each of the target object models, and differences in the way objects are represented in different object models are identified and mapped. Differences in object notation may exist, for example, in the way inheritance is represented, or in the way cardinality of associations is represented.

The preferred embodiment of the invention allows for selective movement of objects and models between business process models and UML. In other words, the user, through the shell process, may select individual objects to be moved between models.

FIGS. 3a–3f are flow diagrams illustrating the movement of type libraries into UML. The process begins in start bubble 42. It then proceeds to create a UML model and a UML top package using the model name inputted into the process 43.

Figure 3A:
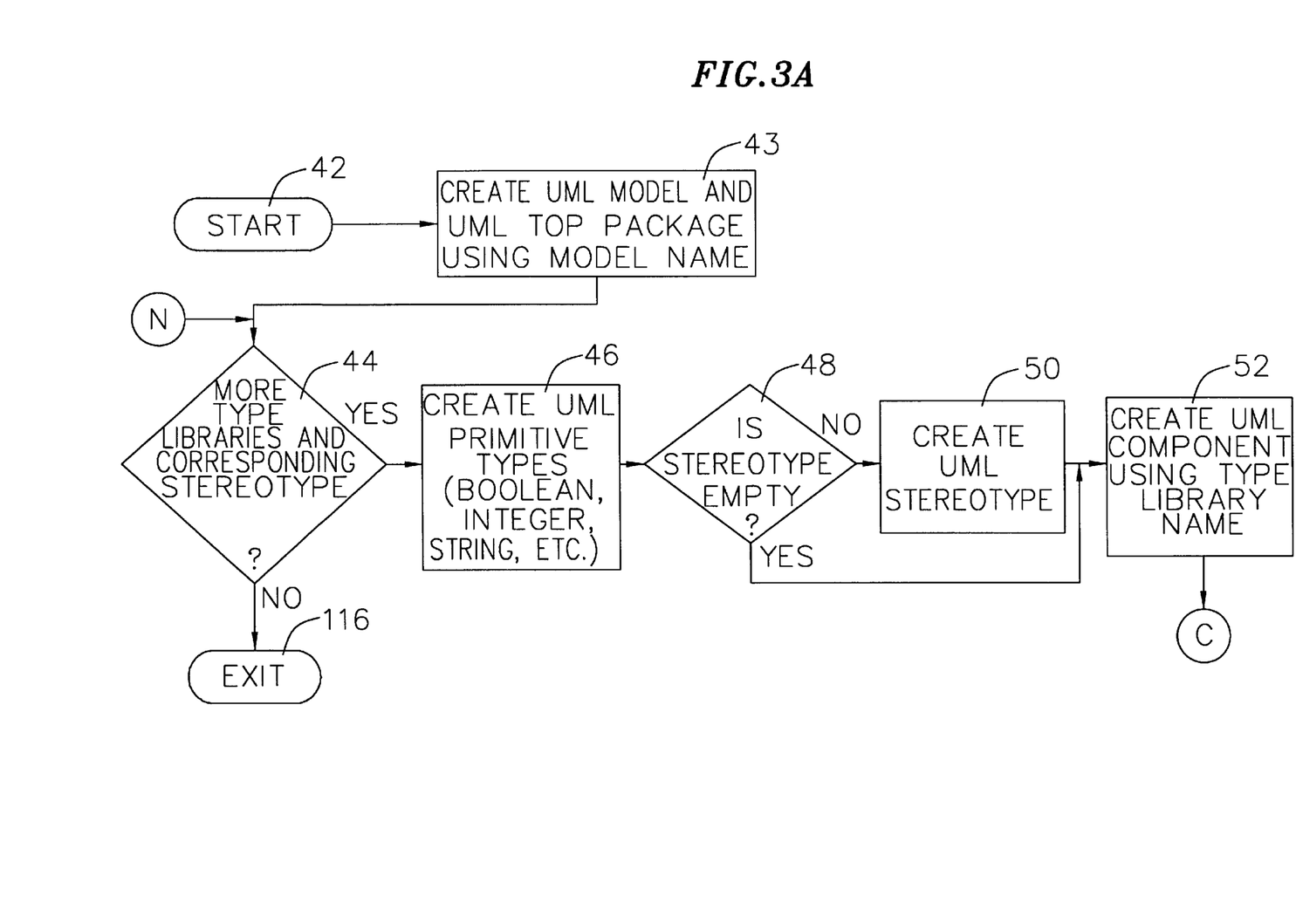
FIGS. 3a–3f are flow diagrams illustrating the transformation of type libraries into a Unified Modeling Language model.

Certain transformation steps must then take place for each type library and corresponding stereotype. Before proceeding, however, it must first be determined whether or not there are any type libraries and corresponding stereotypes to transform (decision diamond 44). If there are, UML primitive types, such as booleans, integers, or strings, are created 46. Then, it must be determined whether or not there is a corresponding stereotype for the type library (decision diamond 48). If there is, the stereotype is not empty, and the corresponding UML stereotype is created 50.

The next step of the process is to create a UML component for the type library using the type library name 52. The process illustration continues in FIG. 3B as denoted by a connector C.

Figure 3B:
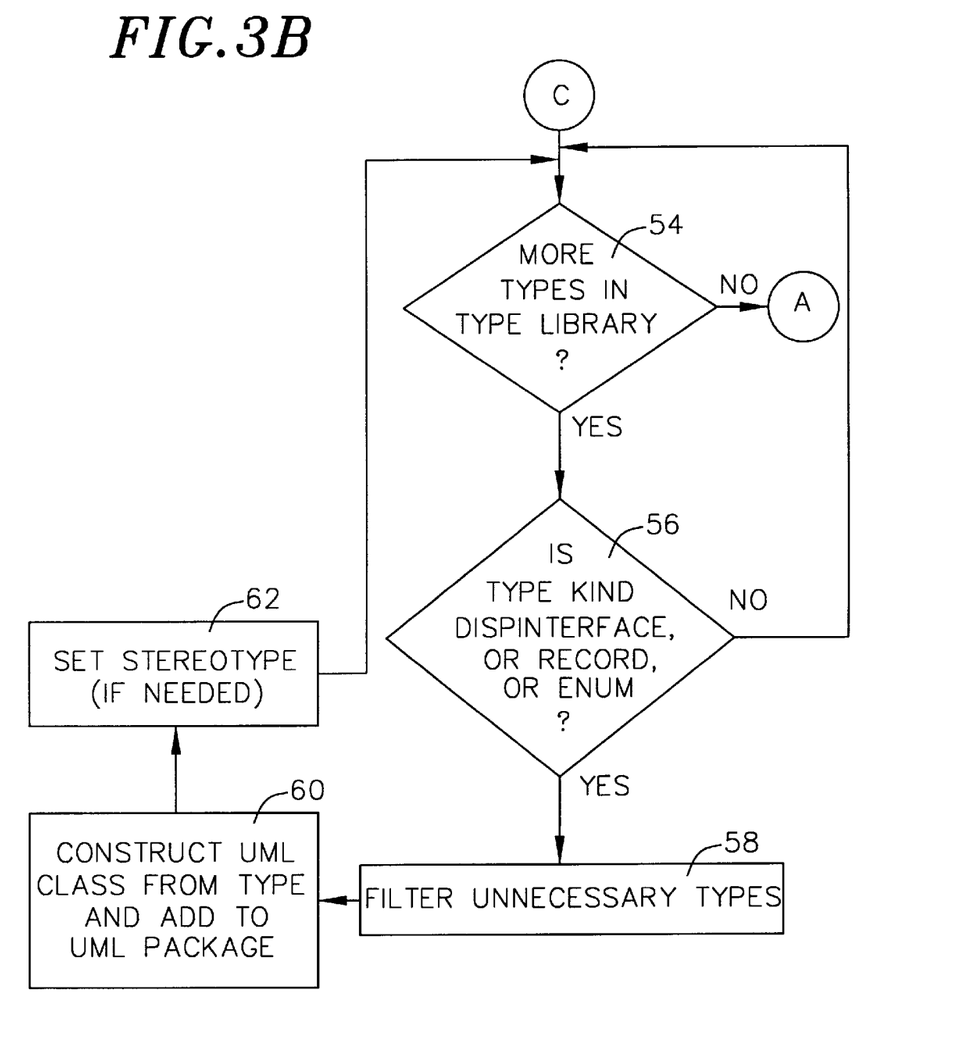

As shown in FIG. 2B, at a connector C all the types of the current type library that is being transformed are checked to determine whether UML classes need to be constructed for them. Therefore, a determination is made in decision diamond 54 as to whether or not there are any types in the type library that have not been checked. If there are, a further inquiry is made as to what the type kind is (decision diamond 56). If the type is a dispinterface, record, or enum, all unnecessary types are first filtered 58. A UMI, class is then constructed from the type and added to the UML package 60. The stereotype for the UML class is also set if needed 62. The routine then checks the remaining types of the type library by asking whether or not there are more types to check (decision diamond 54). If there are no more types in the type library, then an exit is taken, via a connector A, to the next step illustrated in FIG. 3C.

Figure 3C:
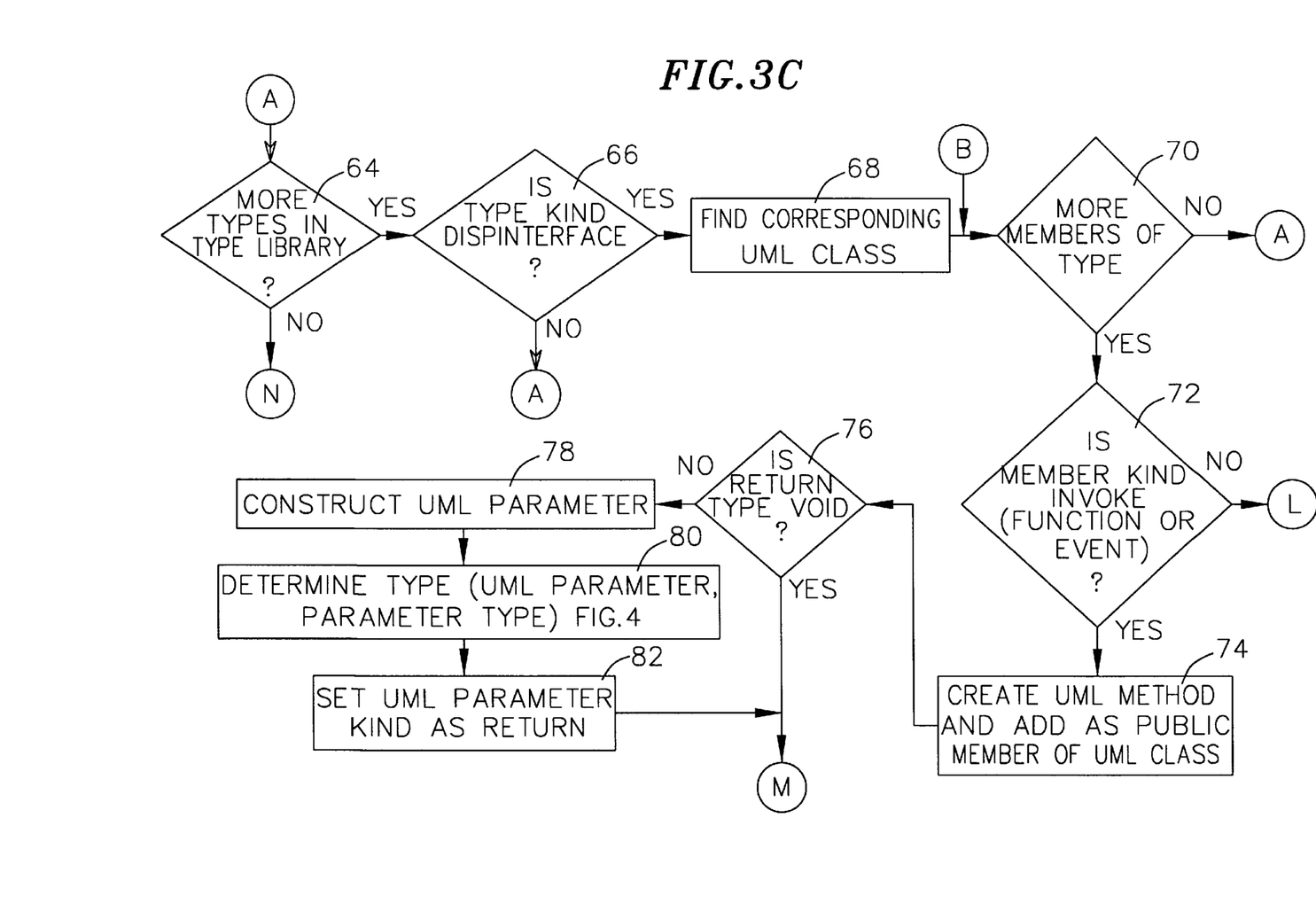
Figure 3D:
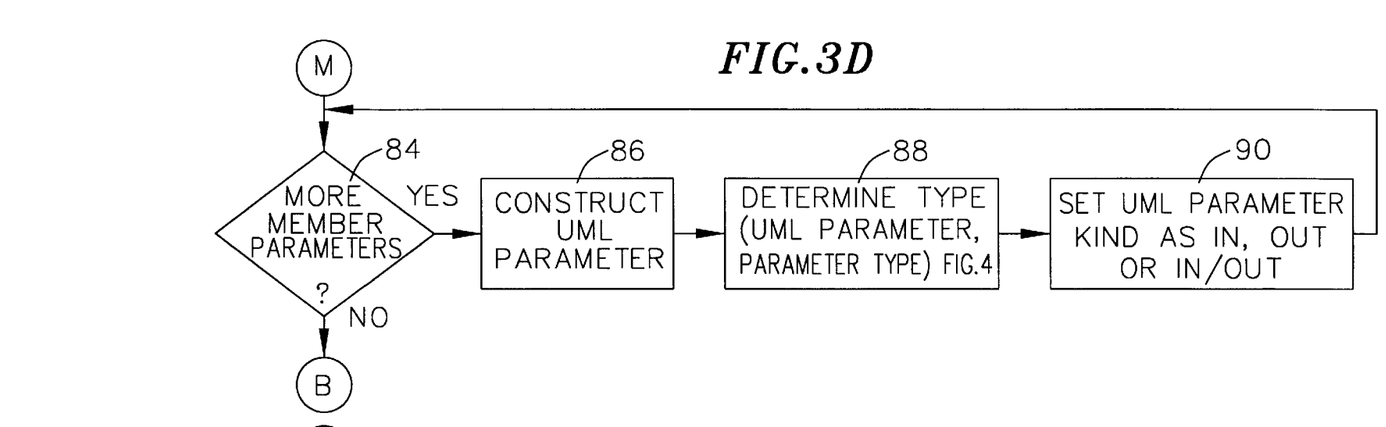

After all the types in the current type library have been checked and appropriate UML classes have been constructed for them, the types are then checked again to perform additional transformations for the dispinterface types (FIG. 3C). Dispinterface is a Microsoft COM (Component Object Model) type. It defines a mechanism used to discover interfaces (where each interface is a collection of methods) between object models.

To check for dispinterface types, an inquiry is made in decision diamond 64, as to whether or not there are more types in the type library. If there are, then a further inquiry is made as to whether or not the type is a dispinterface type (decision diamond 66). An answer of NO results in a check of the remaining types in the type library (see decision diamond 64). An answer of YES causes the process to find the corresponding UML class for the dispinterface type 68.

Next, all the members of the current dispinterface type must be checked and transformed. Members may be of kinds INVOKE, PROPERTY_GET, PROPERTY_PUT, record, enum, or property. Depending on the kind of member, then, either UML methods or UML attributes are created.

Decision diamond 70, therefore, checks whether or not there are any more members to transform. If the answer is YES, an inquiry is made as to whether or not the member kind is INVOKE (decision diamond 72). A member of a type INVOKE may invoke a function or an event on an object. If the member is of a type INVOKE, three things take place. First, a corresponding UML method is created and added as a public member of the corresponding UML class 74.

Second, the member's return type is checked in decision diamond 76. If the return type is not void, a UML parameter is created for the UML method that was created 78. The type for the UML parameter is then determined 80. The process for determining UML types is explained below in conjunction with a description of FIG. 4. The UML parameter kind is then set as the return type 82.

Third, all the parameters of the member are transformed into UML parameters. This begins by making an inquiry in decision diamond 84 (FIG. 3D) as to whether or not there are any more parameters to transform. If the answer is YES, a corresponding UML parameter is constructed 86. Next, the UML type for the parameter is determined 88. The process for determining UML types is explained below in conjunction with a description of FIG. 4. The UML parameter kind is set as IN, OUT, or IN/OUT 90, and the routine reverts back to decision diamond 84 to check the other parameters. If all the parameters of a current member have been checked, the routine checks the next member of the current type in decision diamond 70.

Figure 3E:
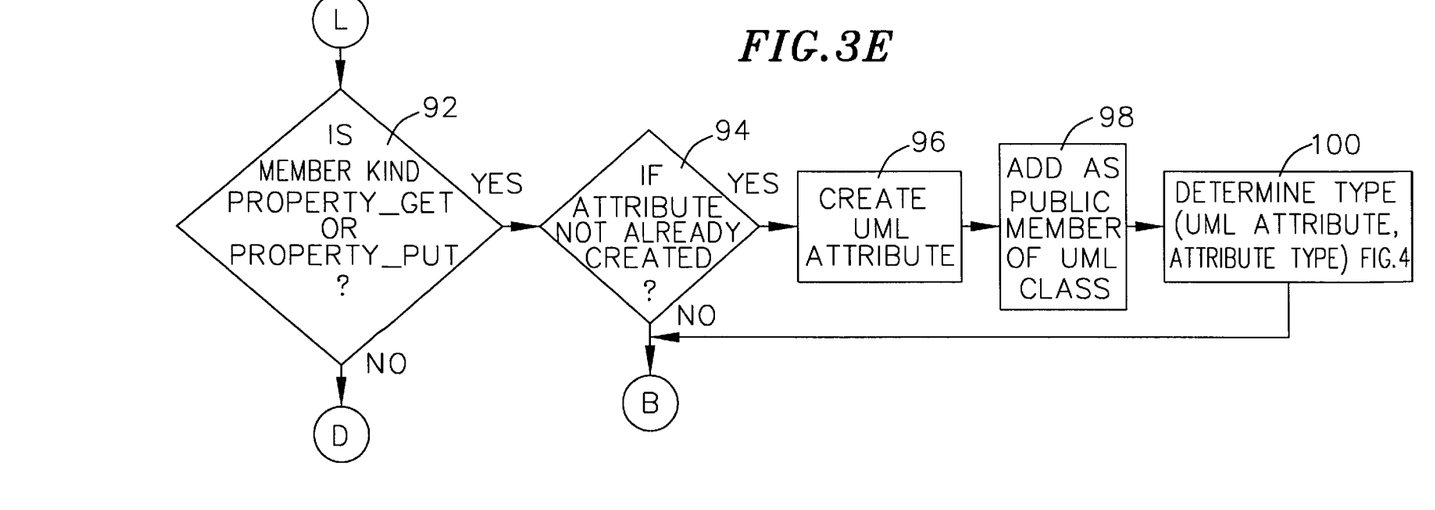

Referring back to decision diamond 72, if the current member is not of a kind INVOKE, as depicted by the NO branch, an inquiry is made as to whether or not the member kind is a PROPERTY_GET or a PROPERTY_PUT (decision diamond 92, FIG. 3E). If it is, then a corresponding UML attribute may have to be created. An inquiry is therefore made in decision diamond 94 as to whether or not an attribute has already been created. If not, a UML attribute is created 96 and added as a public member of the corresponding UML class 98. The UML type for the attribute is then determined 100. This process is described in more detail in conjunction with a description of FIG. 4. The next member is then checked by reverting to decision diamond 70.

Figure 3F:
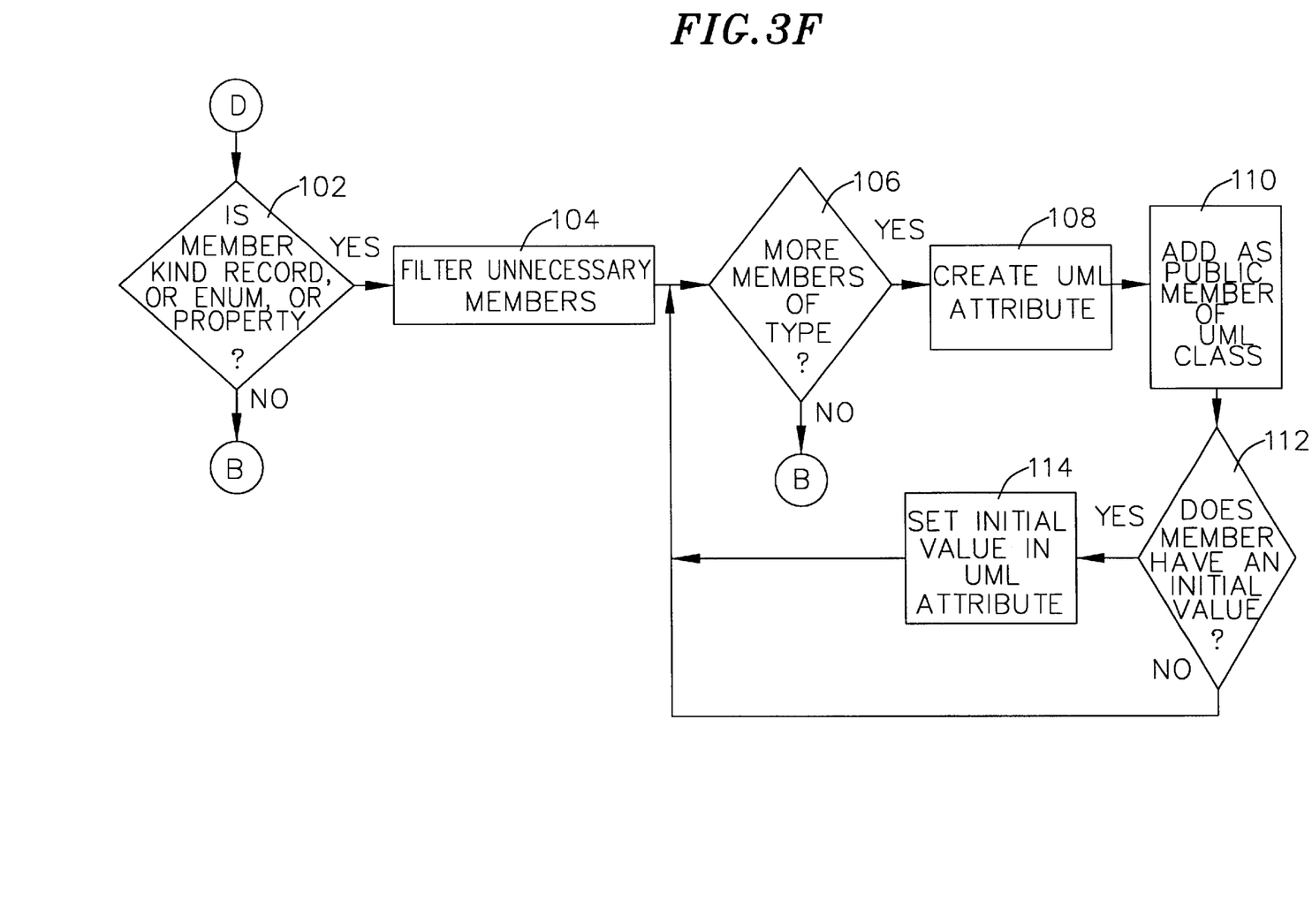

If the member kind is neither an INVOKE nor a PROPERTY_GET nor PROPERTY_PUT, an inquiry is made as to whether the member kind is a record, enum, or property (decision diamond 102, FIG. 3F). An answer of YES filters the unnecessary members 104. Then, for each member, the corresponding UML attribute is created 108 and added as a public member of the UML class 110. If the member has an initial value, as depicted by the YES branch to decision diamond 112, this value is further set as the initial value of the UML attribute 114. The routine then reverts back to decision diamond 106 to check whether or not there are other members to create attributes for.

The routine exits when all the type libraries and corresponding stereotypes have been moved to UML 116.

Figure 4:
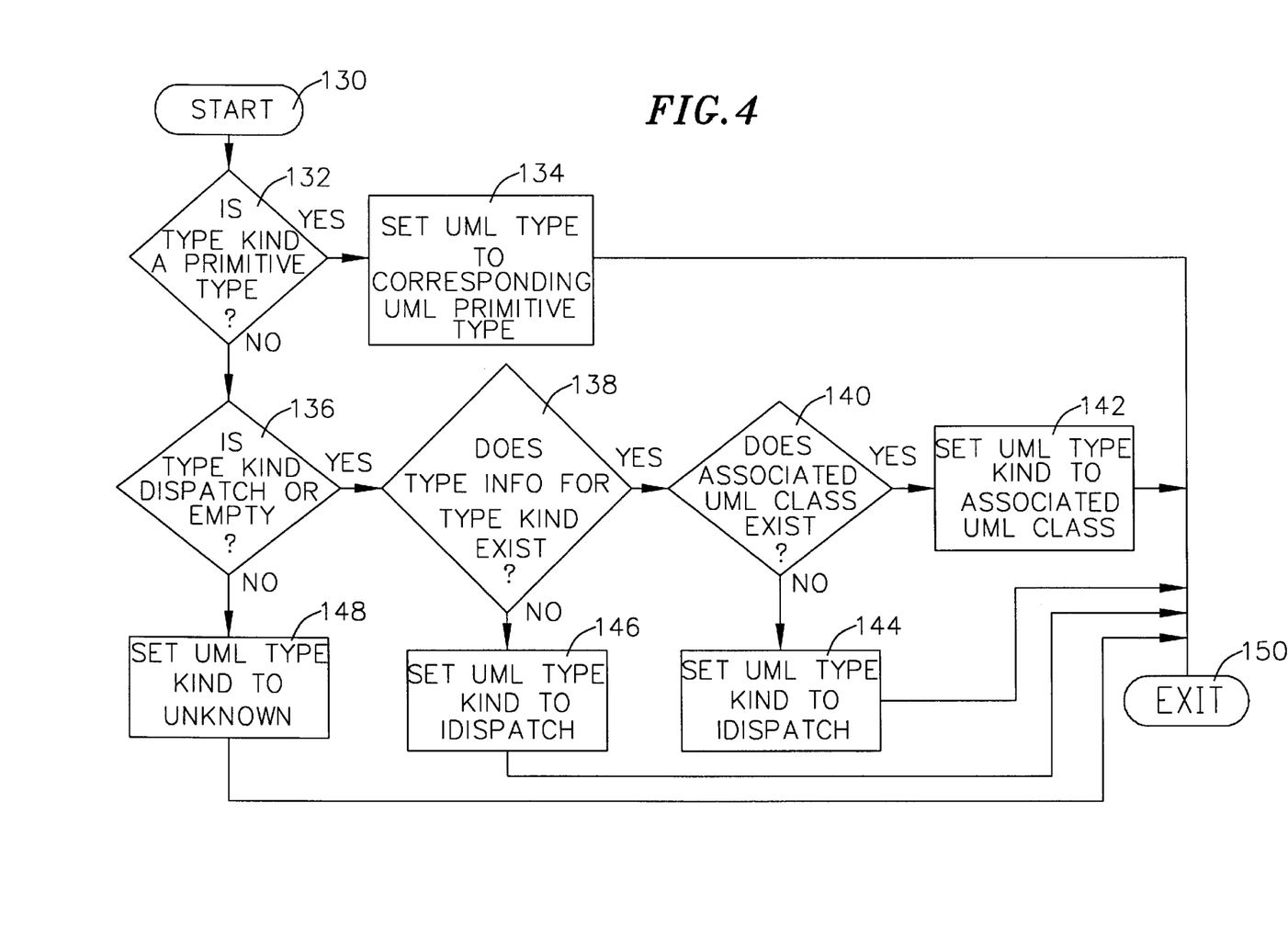
FIG. 4 is a flow diagram illustrating the process for determining Unified Modeling Language types.

FIG. 4 is a flow diagram illustrating how a UML type is determined given a non-UML type kind as input. UML type determinations are made during steps 80 (FIG. 3c), 88 (FIG. 3d), and 100 (FIG. 3e) of the process which transforms type libraries to UML.

The type determination process begins at the start bubble 130. An inquiry is then made as to whether or not the type kind is a primitive type 132. If YES, the UML type is set to a corresponding UML primitive type 134 and the routine exits 150.

If the type kind is not a primitive type, a further inquiry is made as to whether or not the type kind is either a dispatch kind or is empty (decision diamond 136). An answer of YES to either one of those options invokes a further inquiry in decision diamond 138. This inquiry is whether or not there is any type information for this particular type kind. If there is, and an associated UML class also exists, as depicted by the YES branch to decision diamond 140, the UML type kind is set to the associated UML class 142.

Otherwise, if there is no associated UML class for the type kind, the UML type kind is set to IDispatch 144 and the routine exits 150. The UML type kind is also set to IDispatch if there is no information for the type kind (see 138 and 146). IDispatch is a Microsoft COM interface which supports methods that make calls to objects.

If the type kind is not a primitive type, a dispatch type, and is not empty, as depicted by the NO branches to decision diamonds 132 and 136, the UML type kind is set to unknown 148 and the routine exits 150.

Figure 5A:
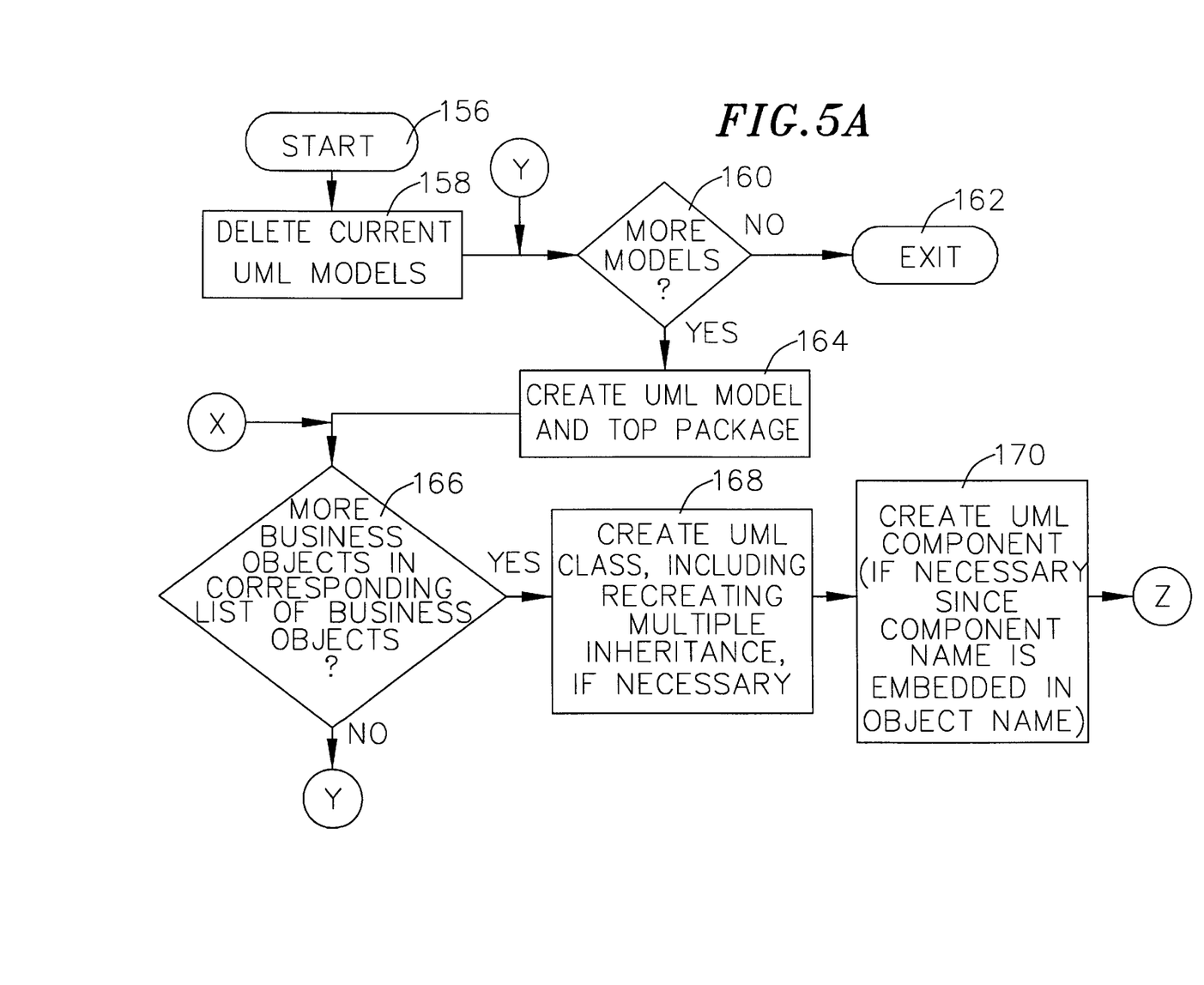
FIGS. 5a–5b are flow diagrams illustrating the exportation of a MooD enterprise model into a Unified Modeling Language model.
Figure 5B:
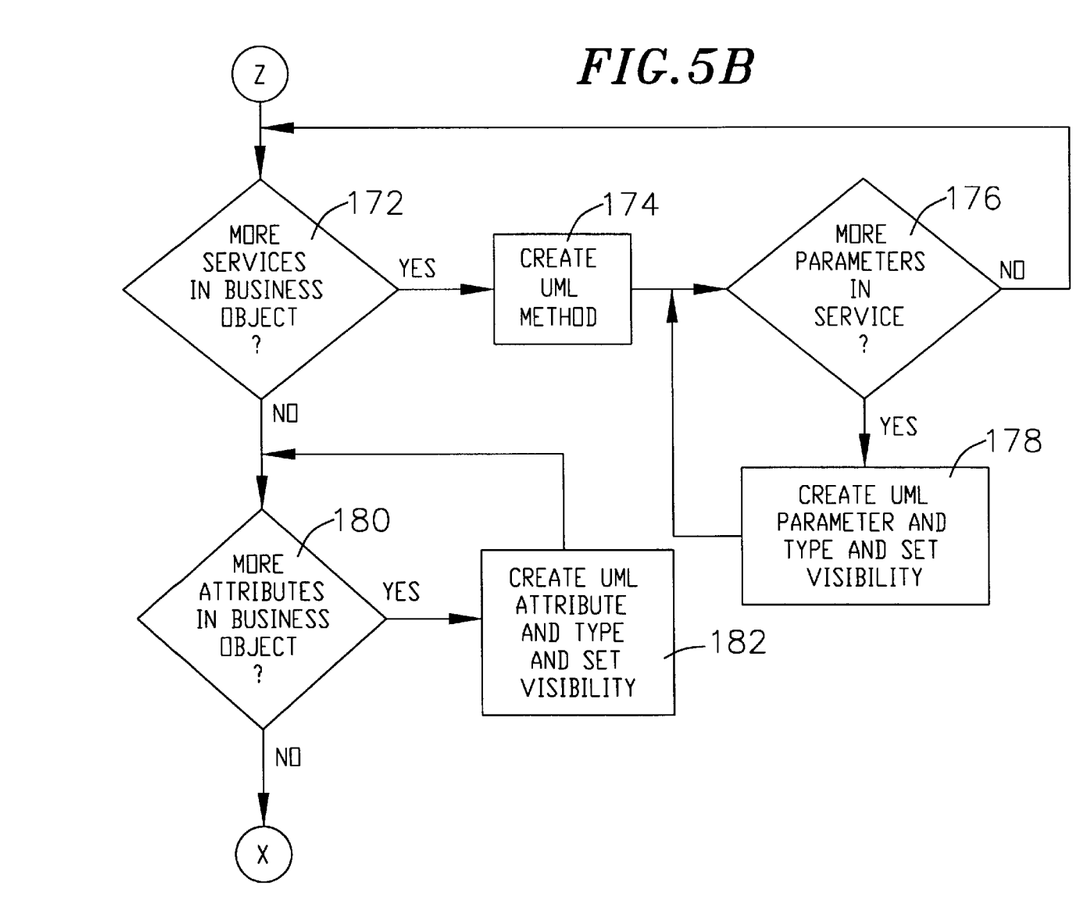

This preferred embodiment of the invention not only allows the movement of type libraries into UML, as described above in conjunction with FIGS. 3a–3f, but also allows movement of any legacy items or business objects from enterprise modeling tools. FIGS. 5a–5b illustrate the exportation of an enterprise model created by MooD (which is a trademark of MooD International, Ltd.), an enterprise modeling tool, into UML. The process begins with the start bubble 156. From here, the process deletes the current UML models 158.

Next, an inquiry is made in decision diamond 160 as to whether or not there are more models that need to be exported to UML. If the answer is NO, the process exits 162. If the answer is YES, a UML model and a top package are created 164.

Then, each business object from an inputted list of business objects is exported to UML. To accomplish this, an inquiry is first made to determine whether or not there are any more business objects to export (decision diamond 166). If the answer is YES, a corresponding UML class is created for the current business object, including the recreation of multiple inheritance, if necessary 168. A corresponding UML component is also created, if necessary, since the component name is embedded in the object name 170. The process illustration continues in FIG. 5B as denoted by a connector Z.

UML methods must then be created for each service in the business object. An inquiry is therefore made in decision diamond 172 as to whether or not there are more services in the business object. If there are, a corresponding UML method is created for the service 174. Next, all the parameters of the current service are transformed to UML. Decision diamond 176 accomplishes this by asking whether or not there are any more parameters to examine. If the answer is YES, the corresponding UML parameter and type are created, and the parameter's visibility is set as being either private or public 178.

Once all the parameters in the service have been transformed, as depicted by the NO branch to decision diamond 176, and there are no more services in the current business object, as depicted by the NO branch to decision diamond 172, the attributes of the current business object are then transformed. An inquiry is thus made in decision diamond 180 as to whether or not there are more attributes in the business object. If the answer is YES, the corresponding UML attribute and type are created, and the attribute's visibility is set as being either private or public 182.

If the answer to decision diamond 180 is NO, indicating that there are no more attributes in the current business object, the routine reverts back to decision diamond 166 (FIG. 5A) to export the next business object to UML.

The preferred embodiment of the invention not only allows the transformation of legacy items into UML, but also the reverse engineering of UML models to business models.

Figure 6:
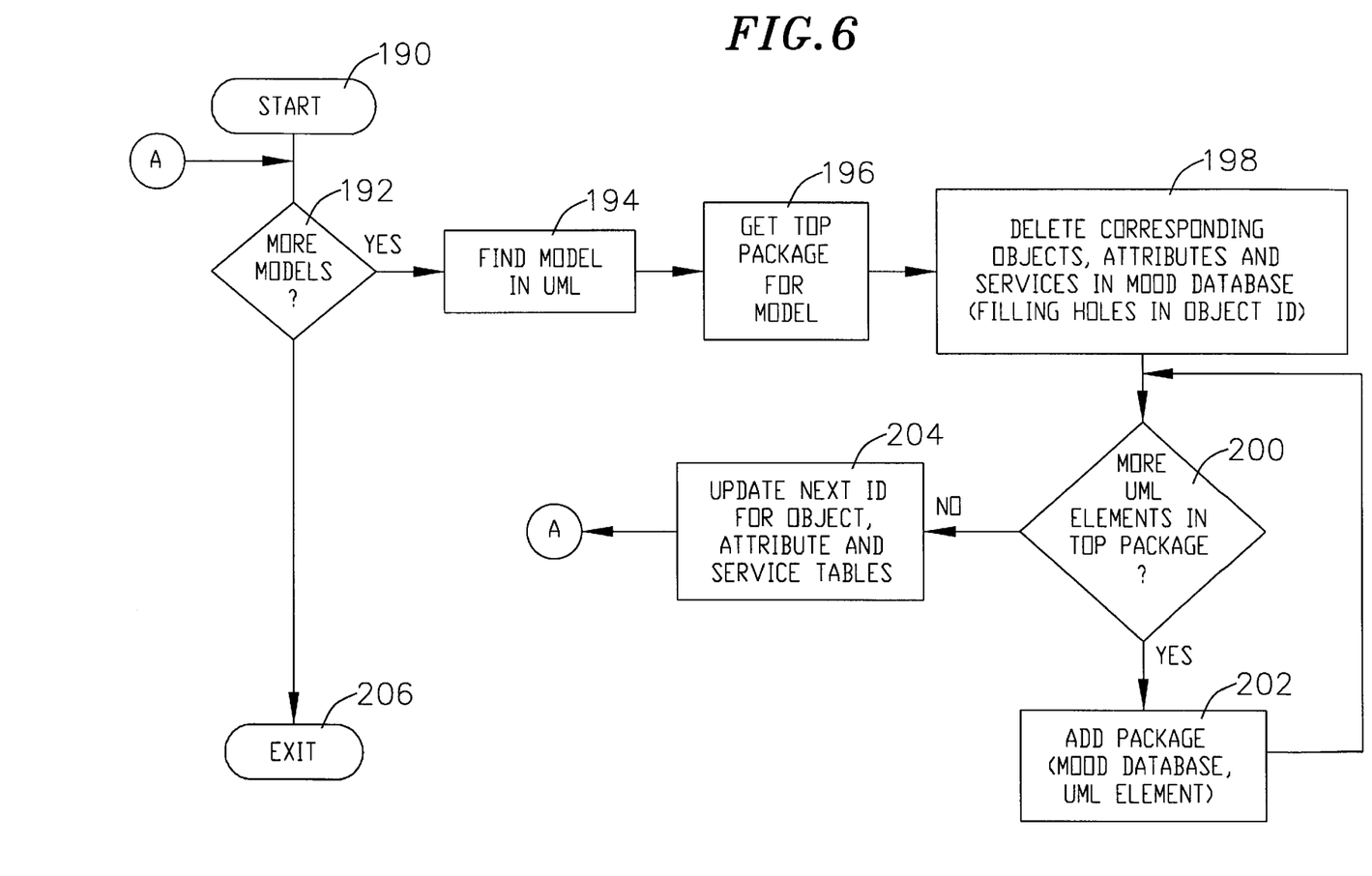
FIG. 6 is a flow diagram illustrating the importation of a MooD enterprise model from a Unified Modeling Language model.

FIG. 6 is a flow diagram showing the process of importing a MooD enterprise model from UML. Beginning in start bubble 190, an inquiry is made as to whether or not there are more UML models to transform to MooD enterprise models (decision diamond 192). If the answer is YES, the corresponding UML model is located 194 and the top package for the model is obtained 196. The corresponding object, attributes, and services in the MooD database are also deleted, filling in the necessary information for the object ID 198.

Then, in decision diamond 200, an inquiry is made as to whether or not there are more UML elements in the top package. If the answer is YES, the elements of the UML packages are added into the MooD database by invoking the Add Package function 202.

Figure 7A:
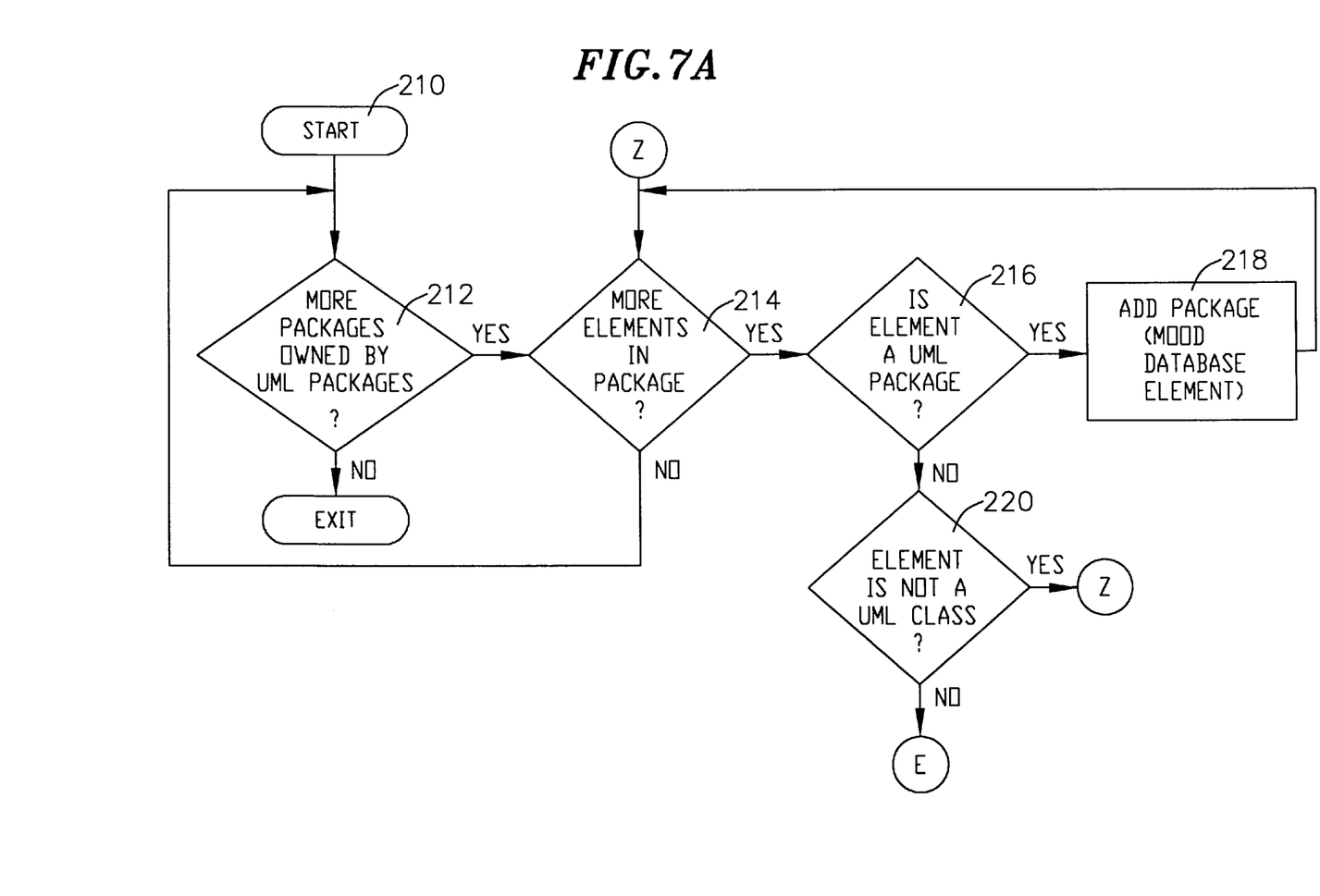
FIGS. 7a–7b are flow diagrams showing the process for the Add Package function invoked by the process in FIG. 6.
Figure 7B:
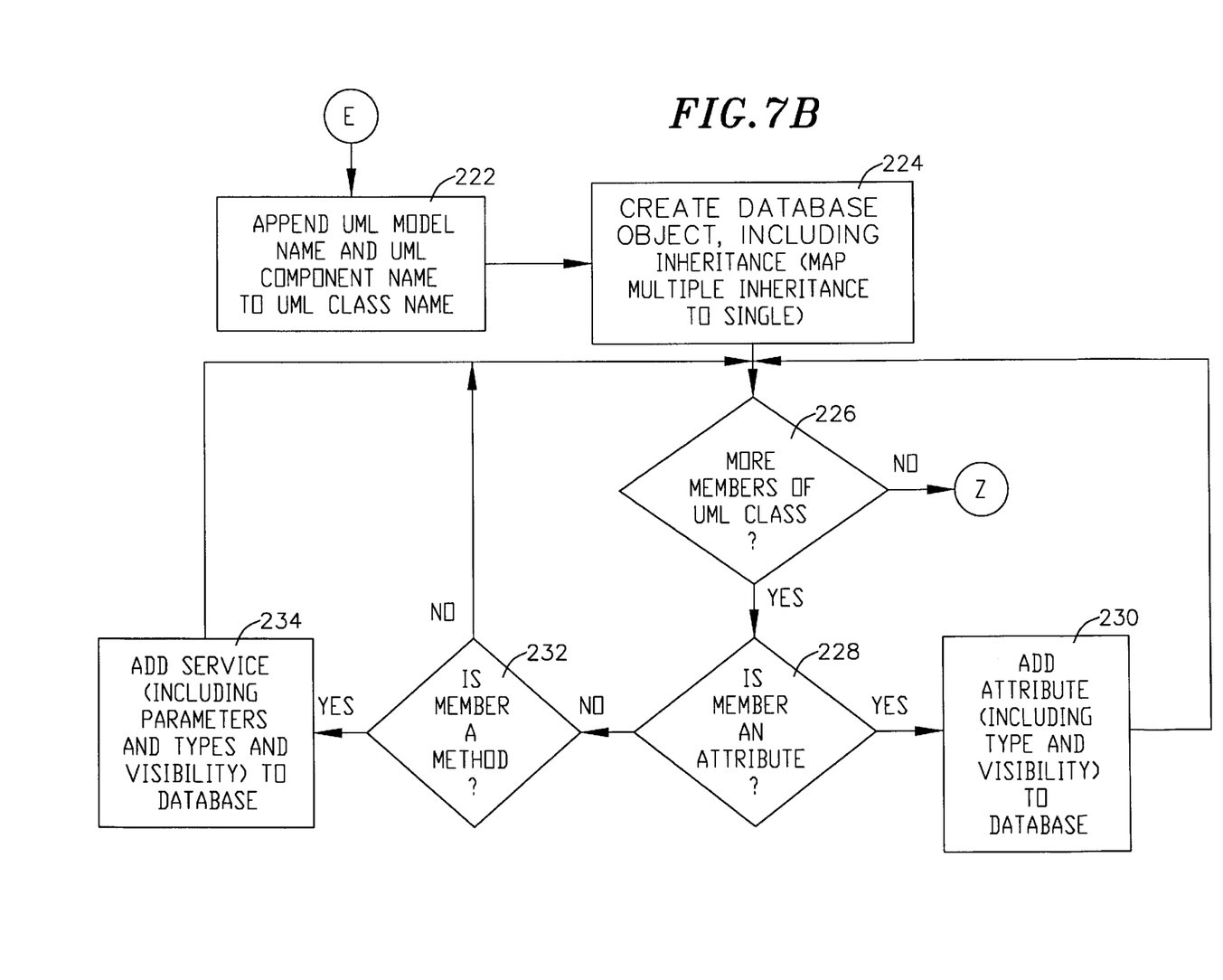

FIGS. 7a–7b are flow diagrams of the Add Package process. From the start bubble 210, an inquiry is made as to whether or not there are more UML packages (decision diamond 212). The YES branch invokes a further inquiry as to whether or not there are any elements in the current package 214. If there are, it must be determined whether or not the element is a UML package 216. A YES answer results in the Add Package function being called again to add the element to the MooD database 218. The rest of the elements of the current package are then checked by reverting to decision diamond 214.

Referring back to decision diamond 216, if the current element is not a UML package, a further inquiry is made in decision diamond 220 as to whether or not the element is a UML class. If the element is neither a UML package nor a UML class, the process simply reverts to decision diamond 214 to check the remaining elements. But if the element is a UML class, the UML model name and the UML component name are appended to the UML class name 222. The database object is also created, including inheritance which allows mapping of multiple inheritance to single inheritance 224.

Each member of the UML class is then checked to determine if it is an attribute or a method. Thus, an inquiry is made in decision diamond 226 to determine if there are more members to check. If there is a member, and the member is an attribute, as depicted by the YES branch to decision diamond 228, the attribute is added to the database, including information on the type and visibility of the attribute 230.

If the member is not an attribute, it must be determined whether or not the member is a method (decision diamond 232). If it is, the service, including parameters, type, and visibility information, is added to the database 234.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. A computer system, including a repository, comprising:
   a.) first means for transforming a first distinctive representation of business model information into an OMG compliant UML representation of at least a portion of a business model and storing said representation in said repository in the form of a set of object classes, said first means for transforming including:
      1) a representation of a business model between one of said distinctive representations and said UML representation of said business model; and
      2) means for creating bi-directional mapping between elements of said method of representation of a business model by said one of the distinctive representations and the method of representation of said business model by said UML representation;
   b.) means for modifying said UML representation of said business model;
   c.) means for modifying a distinctive representation of said business model to reflect the modification in said UML representation of said business model; and
   d.) second means for transforming said UML representation into a second distinctive representation of at least a portion of said business model.

2. The system of claim 1 wherein business model information comprises at least portion of a business model.

3. The system of claim 1 wherein business model information comprises one or more components of a legacy business process application.

4. The system of claim 1 wherein said first distinctive representation comprises a first distinctive representation of a plurality of objects and wherein said first means for transforming comprise means for transforming said first distinctive representation of a subset of said plurality of objects into an OMG compliant UML representation of said subset of said plurality of objects.

5. The system of claim 1 wherein said UML representation comprises a generalized representation of a plurality of objects and wherein said second means for transforming comprise means for transforming said UML representation of a subset of said plurality of objects into a second distinctive representation of said subset of said plurality of objects.

6. A computer-implemented method comprising the steps of:
   a) first step of transforming a first distinctive representation of business model information into an OMG compliant UML representation of at least a portion of a business model;
   b) storing said UML representation as a set of object classes;
   c) second step of transforming said UML representation into a second distinctive representation of at least a portion of said business model;
   d) modifying said business model stored in said UML representation; and e) modifying a distinctive representation of said business model to reflect the modification in said UML representation of said business model.

7. The method of claim 6 wherein the business model information comprises at least portion of a business model.

8. The method of claim 6 wherein the business model information comprises one or more components of a legacy business process application.

9. The method of claim 6 wherein said first step for transforming comprises the steps of:

identifying differences in the method of representation of a business model between one of said distinctive representations and said UML representation of a business model; and creating bi-directional mapping between elements of the method of representation of a business model by said one of said distinctive representations and said method of representation of a business model by said UML representation.

10. The method of claim 6 wherein said first distinctive representation comprises a first distinctive representation of a plurality of objects and wherein said first step of transforming comprises the step of transforming said first distinctive representation of a subset of said plurality of objects into an OMG compliant UML representation of the subset of said plurality of objects.

11. The method of claim 6 wherein said UML representation comprises a generalized representation of a plurality of objects and wherein said second step of transforming comprises the step of transforming said UML representation of a subset of the plurality of objects into a second distinctive representation of the subset of said plurality of objects.

* * * * *